United States Patent
Park et al.

(10) Patent No.: US 9,037,131 B2
(45) Date of Patent: May 19, 2015

(54) EFFICIENT GENERATION OF RADIO COVERAGE MAP OF ACCESS POINTS IN AN INDOOR ENVIRONMENT

(71) Applicant: Qualcomm Incorporated, San Diego, CA (US)

(72) Inventors: Young Shin Park, Stanford, CA (US); Ju-Yong Do, Palo Alto, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/747,930

(22) Filed: Jan. 23, 2013

(65) Prior Publication Data

US 2014/0206340 A1    Jul. 24, 2014

(51) Int. Cl.
*H04W 4/00*      (2009.01)
*H04W 24/00*   (2009.01)
*H04W 16/20*   (2009.01)

(52) U.S. Cl.
CPC .............. *H04W 24/00* (2013.01); *H04W 16/20* (2013.01)

(58) Field of Classification Search
USPC .......... 455/456.1, 456.2, 456.3, 456.5, 456.6, 455/404.2
See application file for complete search history.

(56) References Cited

U.S. PATENT DOCUMENTS

| | | | |
|---|---|---|---|
| 7,286,833 B2 | 10/2007 | Friday et al. | |
| 7,437,127 B2 | 10/2008 | Goren et al. | |
| 7,626,969 B2 | 12/2009 | Hart et al. | |
| 8,175,608 B2 | 5/2012 | Kalika et al. | |
| 2008/0085692 A1 | 4/2008 | Hart et al. | |
| 2008/0166973 A1 | 7/2008 | Hart et al. | |
| 2008/0280565 A1 | 11/2008 | Jevremovic et al. | |
| 2011/0263277 A1 | 10/2011 | Zuniga | |
| 2012/0220295 A1 | 8/2012 | Kumar et al. | |
| 2013/0012227 A1* | 1/2013 | Nadler et al. | 455/456.1 |
| 2014/0206380 A1 | 7/2014 | Do et al. | |

FOREIGN PATENT DOCUMENTS

WO    2012140244 A1    10/2012

OTHER PUBLICATIONS

International Search Report and Written Opinion—PCT/US2014/012426—ISA/EPO—Jul. 8, 2014.

(Continued)

*Primary Examiner* — Khalid Shaheed

(74) *Attorney, Agent, or Firm* — Muncy, Geissler, Olds & Lowe, P.C.

(57) ABSTRACT

A method for generating a radio coverage map. A two-dimensional radio coverage map located between a first physical level and a second physical level is generated. The access point is located above the second physical level. The two-dimensional radio coverage map is located at a distance from the access point and comprises a plurality of map points, where the map points have a predicted received signal strength value. A projection window is determined. A projected area on the two-dimensional radio coverage map is determined by computing a geometrical projection from the access point through the projection window onto the two-dimensional radio coverage map. A plurality of first points in a first area on the two-dimensional radio coverage map is identified. The first area is outside the projected area. The predicted received signal strength value of each of the first points is reduced by a value equal to the signal attenuation caused by the second physical level.

48 Claims, 10 Drawing Sheets

(56) References Cited

OTHER PUBLICATIONS

Lott M., et al., "A Multi-Wall-And-Floor Model for Indoor Radio Propagation", Connecting the Mobile World: Proceedings / IEEE VTS 53rd Vehicular Technology Conference, Spring, 2001; [IEEE Vehicular Technolgy Conference], IEEE Service Center, USA, vol. Conf. 53, May 6, 2001, pp. 464-468, XP001067003, DOI: 10.1109NETECS.2001.944886 ISBN: 978-0-7803-6728-9, the whole document.

* cited by examiner

EFFICIENT GENERATION OF RADIO COVERAGE MAP OF ACCESS POINTS IN AN INDOOR ENVIRONMENT

REFERENCE TO CO-PENDING APPLICATIONS FOR PATENT

The present application for patent is related to the following co-pending U.S. patent application Ser. No. 13/748,007: "Fast Generation of Radio Coverage Map of Access Points in an Indoor Environment" by Do et al., filed concurrently herewith, assigned to the assignee hereof, and expressly incorporated by reference herein.

FIELD OF DISCLOSURE

The presently disclosed embodiments are directed to the field of generating radio coverage maps of access points in an indoor environment.

BACKGROUND

A radio coverage map of an access point is a map of the signal strength of a signal transmitted by the access point as received at various locations on the map. Radio coverage maps of access points located in a building are important in indoor positioning. Radio coverage maps of access points located in the building are provided to a mobile station to assist the mobile station in determining its position. Using the radio coverage maps, the mobile station determines which access points to scan. The mobile station scans these access points and measures received signal strength indicator (RSSI) values from signals transmitted by these access points. The radio coverage map is also commonly called an RSSI heatmap. The radio coverage map is usually a three-dimensional radio coverage map. The radio coverage map is typically generated in advance by a server. Traditionally, the radio coverage map is generated by using the well-known dominant path model or ray tracing model.

Buildings such as malls and airports often have partial ceilings. In other words, two or more physical levels (i.e., floors or ceilings) of such building share the same top ceiling. If the partial ceilings are considered in the traditional process of generating the radio coverage maps of the access points located in such building (for example, by using the dominant path model or ray tracing model), this traditional process will require a very large amount of time and processing power. Thus, using the traditional process, it is not possible to generate quickly a radio coverage map of an access point located in such building, and it is not feasible for a mobile station, with its limited processing power, to generate a radio coverage map by itself.

SUMMARY

Exemplary embodiments of the invention are directed to systems and method for efficiently generating a radio coverage map of an access point in an indoor environment.

A method for generating a radio coverage map for an access point in a wireless environment comprising a plurality of physical levels is disclosed. The plurality of physical levels includes a first physical level and a second physical level located above the first physical level. The access point is located above the second physical level. A two-dimensional radio coverage map located between the first physical level and the second physical level is generated without taking into account a signal attenuation caused by the second physical level. The two-dimensional radio coverage map is located at a target distance from the access point and comprises a plurality of map points. Each of the map points has a predicted received signal strength value. A projection window located at a same vertical level as the second physical level is determined. A projected area on the two-dimensional radio coverage map is determined by computing a geometrical projection from the access point through the projection window onto the two-dimensional radio coverage map. A plurality of first points in a first area on the two-dimensional radio coverage map is identified. The first area is outside the projected area. Each of the first points has a predicted received signal strength value. The predicted received signal strength value of each of the first points is reduced by a value equal to the signal attenuation caused by the second physical level.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc. One embodiment may be described by a schematic drawing depicting a physical structure. It is understood that the schematic drawing illustrates the basic concept and may not be scaled or depict the structure in exact proportions.

Embodiments of the invention are directed to apparatus and method for efficient generation of radio coverage map of an access point in an indoor environment. The technique provides a simplified process of generating a radio coverage map. The simplified process does not require much of processing power, thus can be performed by a mobile station. Employing the simplified process, either a location assistant server or a mobile station can quickly generate a radio coverage map for an access point. This is of particular benefit for a mobile station, since the mobile station can quickly determine which access points are most likely to be radio visible from the current coarse position of the mobile station. The mobile station can then focus on these most likely to be radio visible access points for scanning and measurement. An access point is radio visible to the mobile station if the signal strength of a signal transmitted by the access point as received at the current coarse position of the mobile station is sufficient for communication; in other words, the signal strength is above a predetermined minimum threshold.

Figure 1:
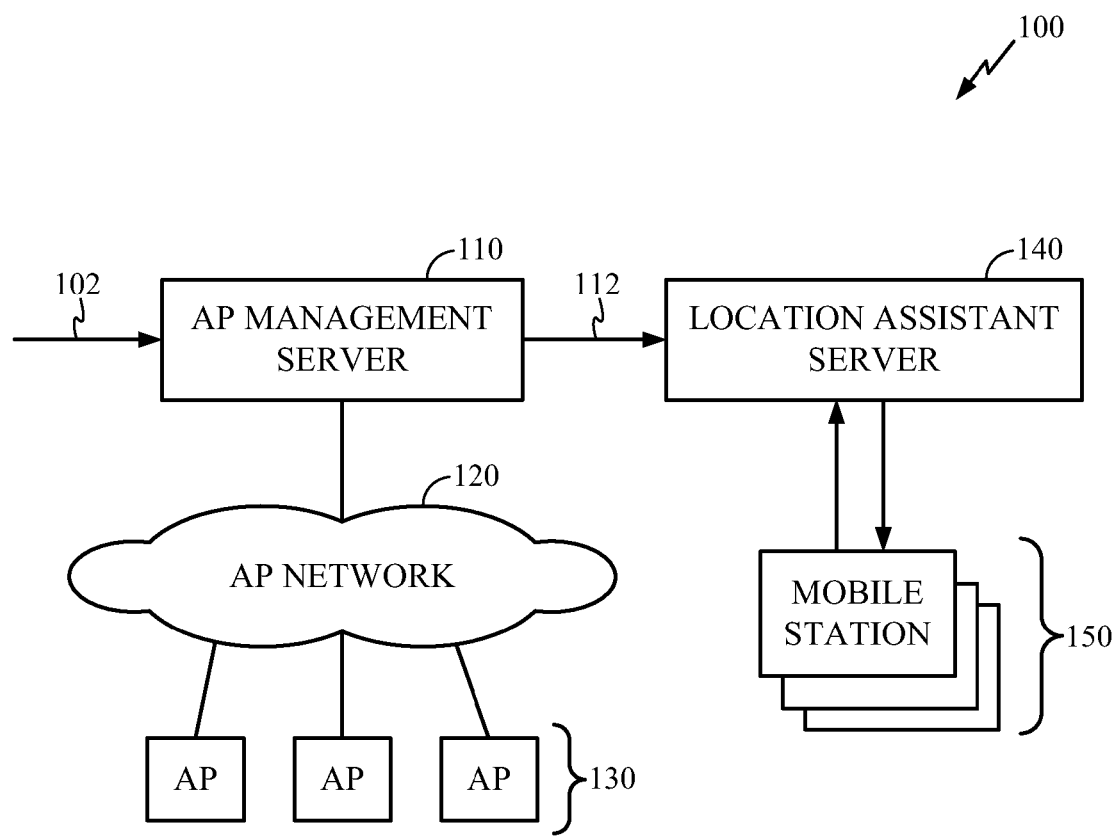
FIG. 1 is a diagram illustrating a system 100 in which one embodiment of the invention may be practiced.

FIG. 1 is a diagram illustrating a system 100 in which one embodiment of the invention may be practiced. The system 100 includes an access point management server 110, an access point network 120, a plurality of access points 130, a location assistant server 140, and a plurality of mobile stations 150. The term "venue" is used herein to designate the local environment. The access point management server 110 receives information 102 from a venue operator or from information technology personnel. The information 102 includes map information of the venue, and information related to the access points located in the venue. The map information of the venue includes information regarding a structural layout of the wireless environment, and optionally includes information regarding material types of the plurality of physical levels (that is, ceilings, floors) in the venue. The information related to the access points located in the venue includes location information of the access points. The access point management server 110 uses the access point network 120 to communicate with the access points 130. The access point management server 110 provides information 112 to the location assistant server 140. The information 112 includes the map information of the venue, and the information related to the access points located in the venue. Based on the received information 112, the location assistant server 140 generates radio coverage maps of the access points located in the venue. The location assistant server 140 receives requests for assistance from the mobile stations 150 and provides the radio coverage maps to the mobile stations 150. Embodiments of the invention may be practiced by the location assistant server 140.

Figure 2:
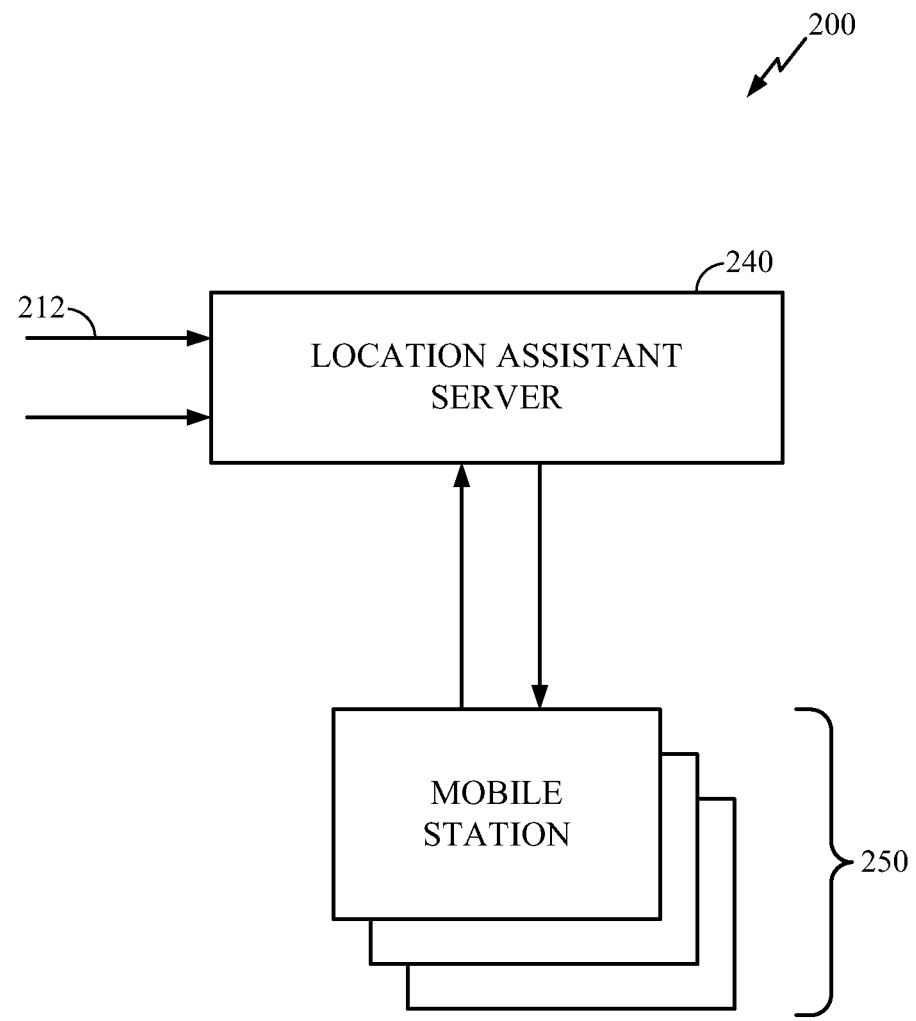
FIG. 2 is a diagram illustrating a system 200 in which one embodiment of the invention may be practiced.

FIG. 2 is a diagram illustrating a system 200 in which one embodiment of the invention may be practiced. The system 200 includes a location assistant server 240 and a plurality of mobile stations 250. The location assistant server 240 receives information 212 directly from a venue operator and/or a public data contributor having access to map information of the venue and information related to the access points located in the venue. The information 212 includes map information of the venue, and information related to the access points located in the venue. The map information of the venue includes information regarding a structural layout of the wireless environment, and optionally includes information regarding material types of the plurality of physical levels (that is, ceilings, floors) in the venue. The information related to the access points located in the venue includes location information of the access points. Based on the received information 212, the location assistant server 240 generates radio coverage maps of the access points located in the venue. The location assistant server 240 receives requests for assistance from the mobile stations 250 and provides the radio coverage maps to the mobile stations 250. Embodiments of the invention may be practiced by the location assistant server 240.

Figure 3:
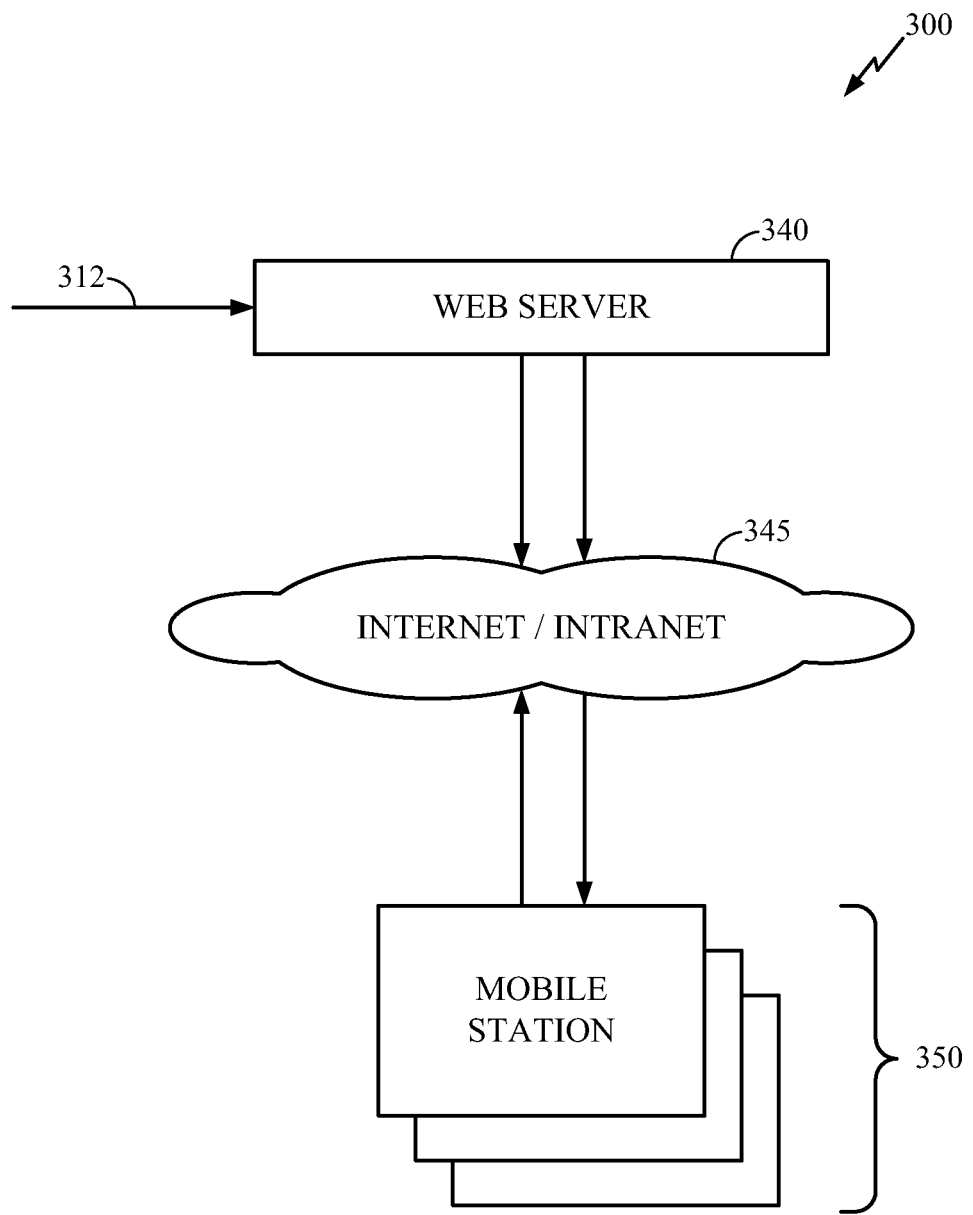
FIG. 3 is a diagram illustrating a system 300 in which one embodiment of the invention may be practiced.

FIG. 3 is a diagram illustrating a system 300 in which one embodiment of the invention may be practiced. The system 300 includes a Web server 340, the Internet or intranet 345, and a plurality of mobile stations 350. The Web server 340 receives information 312 from a venue operator. The information 312 includes map information of the venue, and information related to the access points located in the venue. The map information of the venue includes information regarding a structural layout of the wireless environment, and optionally includes information regarding material types of the plurality of physical levels (that is, ceilings, floors) in the venue. The information related to the access points located in the venue includes location information of the access points. The information 312 is saved at the Web server 340 and is accessible via a Uniform Resource Locator (URL). The mobile stations 350 may obtain this URL through known mobile applications. The mobile stations 350 may also obtain this URL by searching for beacons located in the venue. The beacons may be radio beacons (such as WiFi access point, Bluetooth access point) or visual beacons (such as Quick Response code, other types of matrix codes, and bar codes). Providing this URL to the Internet/Intranet 345, the mobile stations 350 accesses and retrieves the information 312 stored at the Web server 340. Based on the retrieved information 312, the mobile stations 350 generate radio coverage maps of the access points located in the venue. Embodiments of the invention may be practiced by each of the mobile stations 350.

Figure 4:
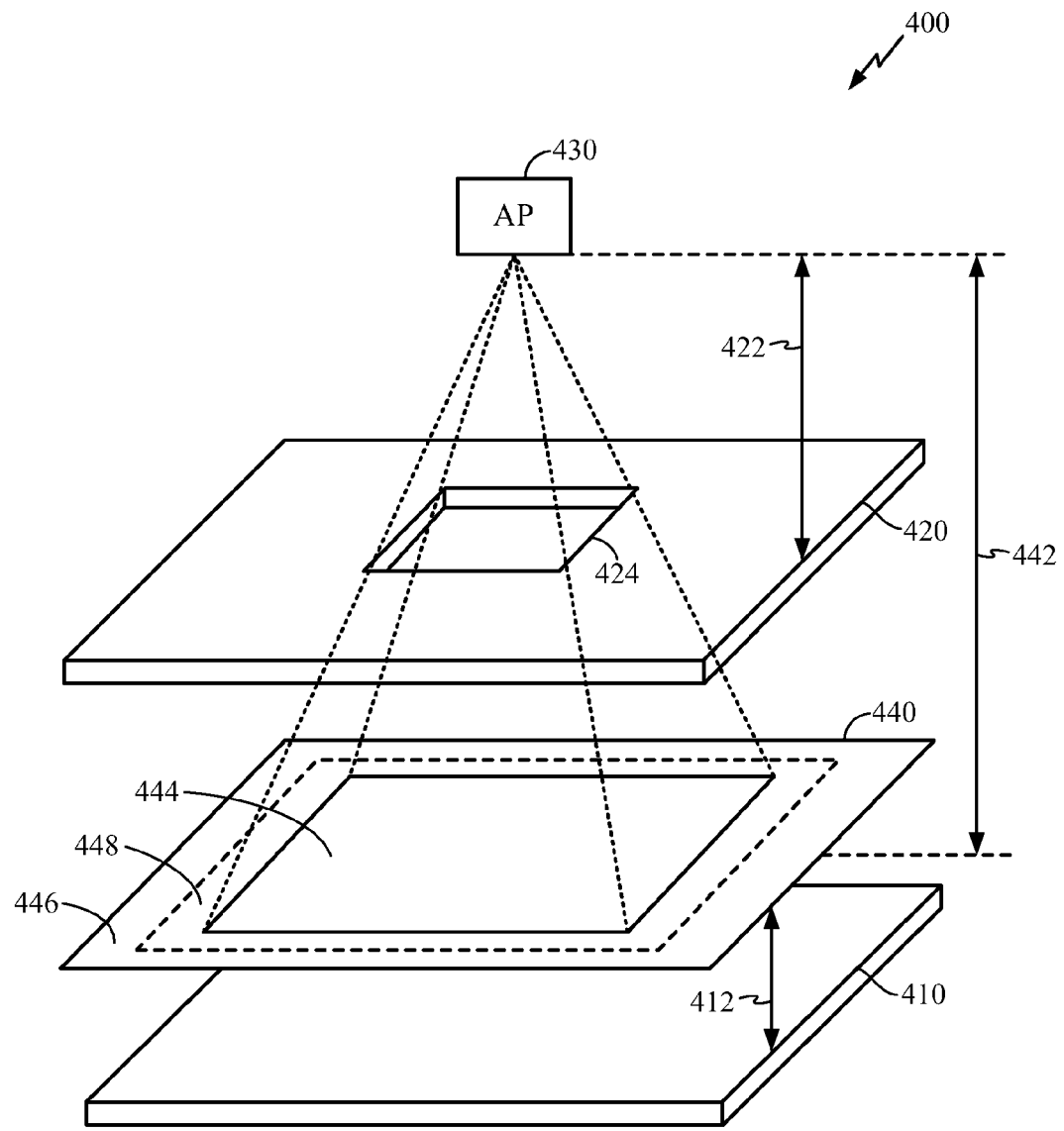
FIG. 4 is a diagram illustrating a wireless environment 400 in which embodiments of the invention may be practiced.

FIG. 4 is a diagram illustrating a wireless environment 400 in which embodiments of the invention may be practiced. The wireless environment 400 comprises a first physical level 410 and a second physical level 420 located above the first physical level 410. The wireless environment 400 includes an access point 430 located above the second physical level 420 at a distance 422 from the second physical level 420.

A two-dimensional radio coverage map 440 located between the first physical level 410 and the second physical level 420 is generated by embodiments of the invention. The two-dimensional radio coverage map 440 is located at a target distance 442 from the access point 430, and at a distance 412 from the first physical level 410. The distance 412 is commonly referred to as the prediction height and ranges from 1 meter to 1.5 meters. This prediction height corresponds to a typical distance of a transceiver of a mobile station from the first physical level 410. The two-dimensional radio coverage map 440 comprises a plurality of map points. Each of the map points has a predicted received signal strength value which representing a predicted received signal strength of a signal transmitted by the access point 430. The two-dimensional radio coverage map 440 comprises a projected area 444 and a first area 446. The first area comprises the map points that are located outside of the projected area 444. The two-dimensional radio coverage map 440 may optionally include a second area 448 which is adjacent to the boundary of the projected area 444, and comprises transition points.

A projection window 424 is located at a same vertical level as the second physical level 420. The projection window may be an open space. The projection window 424 may also be an area having a specific material type which causes a specific attenuation to a received signal strength of a signal transmitted by the access point 430 and passing through the projection window 424. For example, the specific material type may be wood, or metal, or concrete, etc.

The projected area 444 on the two-dimensional radio coverage map is generated by computing a geometrical projection from the access point 430 through the projection window 424 onto the two-dimensional radio coverage map 440.

Figure 5:
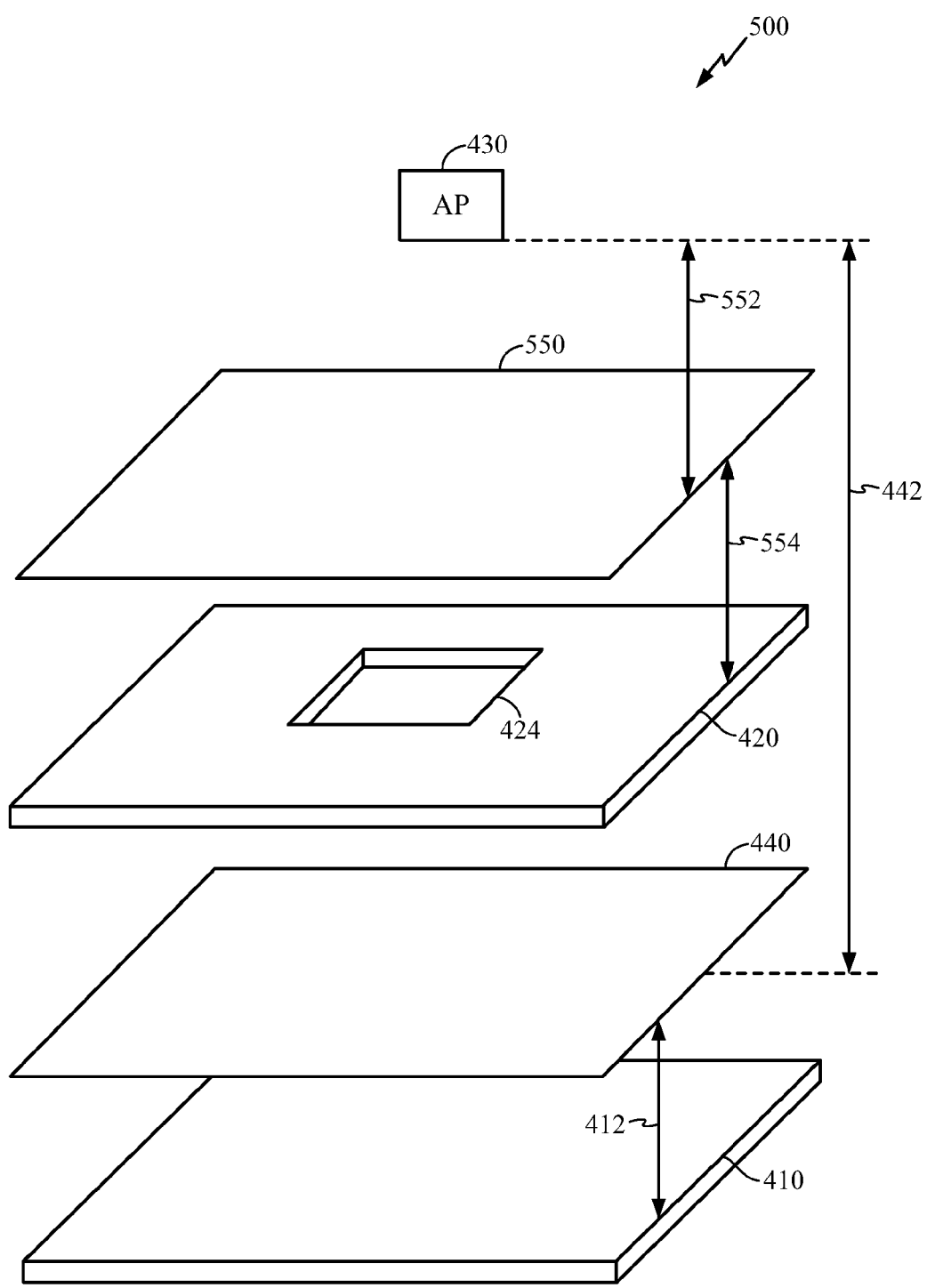
FIG. 5 is a diagram illustrating an embodiment of the invention where a two-dimensional radio coverage map 440 is generated from a first radio coverage map 550.

FIG. 5 is a diagram illustrating an embodiment 500 of the invention where the two-dimensional radio coverage map 440 is generated from a first radio coverage map 550. The wireless environment comprises the first physical level 410 and the second physical level 420, as described previously with respect to FIG. 4.

Referring to FIG. 5, a first two-dimensional radio coverage map 550 for the access point 430 is generated. In a wireless environment that includes more than two physical levels, the first two-dimensional radio coverage map is preferably at a prediction height above the physical level that is closest to the access point. The first two-dimensional radio coverage map 550 is located at a distance 552 from the access point 430, and at a distance 554 (i.e., prediction height) from the second physical level 420. The first two-dimensional radio coverage map 550 comprises a plurality of original points. Each of the original points has a predicted value representing a predicted received signal strength of a signal transmitted by the access point 430.

The target distance 442 is selected to place the two-dimensional radio coverage map 440 at the target distance 442 from the access point 430. Coordinates of the map points of the two-dimensional radio coverage map 440 are generated from coordinates of corresponding original points of the first two-dimensional radio coverage map 550. A ratio of the target distance 442 to the first distance 552 is used to magnify the coordinates of an original point of the first two-dimensional radio coverage map 550 to obtain the coordinates of the corresponding map point of the two-dimensional radio coverage map 440. In other words, coordinates of the map points of the two-dimensional radio coverage map 440 are generated by magnifying the first radio coverage map 550 using a ratio of the target distance 442 to the first distance 552. An offset value representing an attenuation due to the target distance 442 being different than the first distance 552 is computed. For each of the map points of the two-dimensional radio coverage map 440, a predicted received signal strength value is generated by adding the offset value to the predicted value of the corresponding one of the original points of the first two-dimensional radio coverage map 550.

Figure 6:
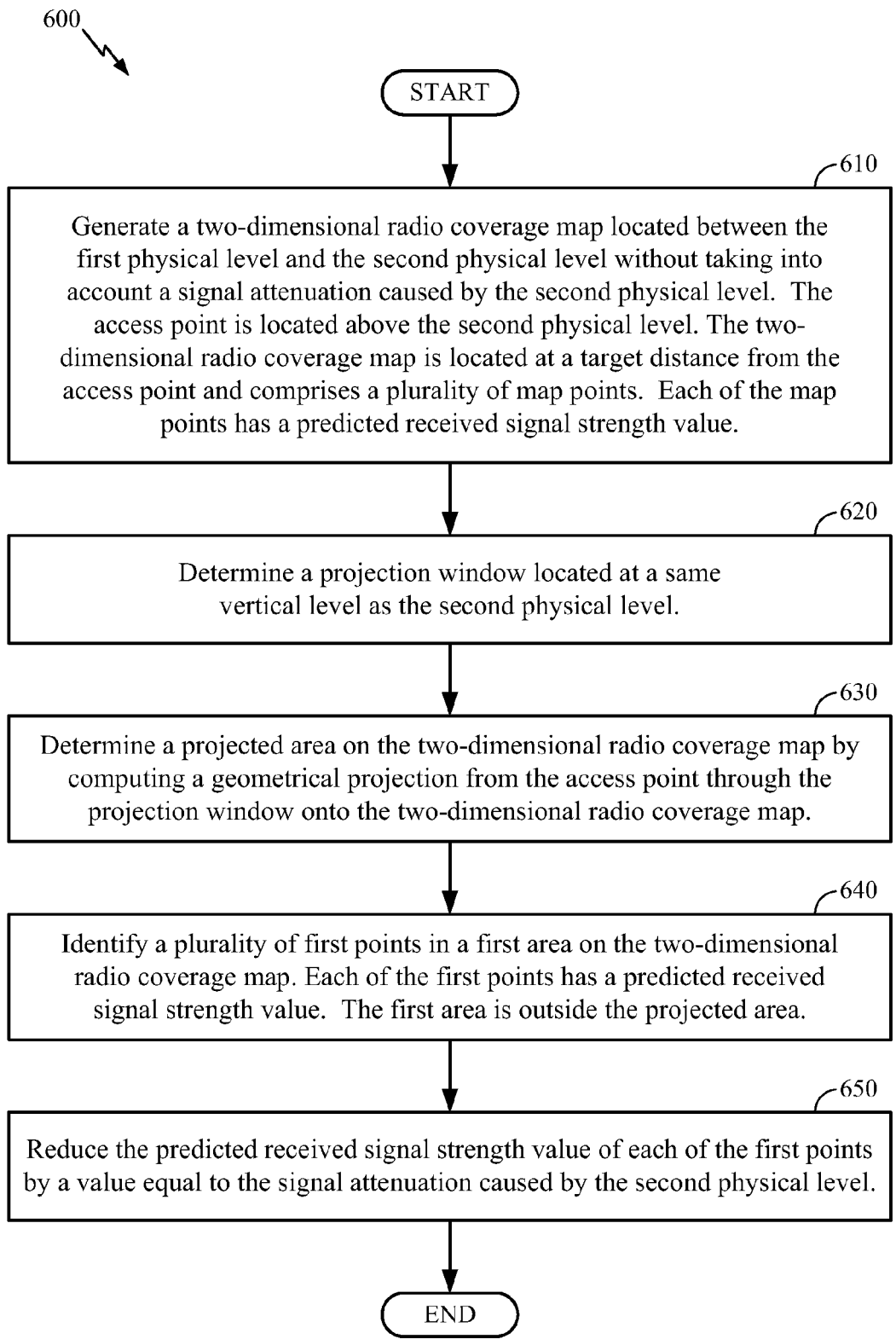
FIG. 6 is a flowchart illustrating a process of generating a radio coverage map for an access point in a wireless environment according to one embodiment.

FIG. 6 is a flowchart illustrating a process 600 of generating a radio coverage map for an access point in a wireless environment according to one embodiment. The wireless environment comprises a plurality of physical levels including a first physical level and a second physical level located above the first physical level.

Referring to FIG. 6 and FIG. 4, upon START, the process 600 generates a two-dimensional radio coverage map 440 located between the first physical level 410 and the second physical level 420 without taking into account a signal attenuation caused by the second physical level 420 (Block 610). The access point 430 is located above the second physical level 420. The two-dimensional radio coverage map 440 is located at a target distance 442 from the access point 430 and comprises a plurality of map points. Each of the map points has a predicted received signal strength value. The process 600 determines a projection window 424 located at a same vertical level as the second physical level 420 (Block 620). Next, the process 600 determines a projected area 444 on the two-dimensional radio coverage map 440 by computing a geometrical projection from the access point 430 through the projection window 424 onto the two-dimensional radio coverage map 440 (Block 630). Then, the process 600 identifies a plurality of first points located in a first area 446 on the two-dimensional radio coverage map 440 (Block 640). Each of the first points has a predicted received signal strength value. The first area 446 is outside the projected area 444. Next, the process 600 reduces the predicted received signal strength value of each of the first points by a value equal to the signal attenuation caused by the second physical level 420 (Block 650). The process 600 is then terminated.

Figure 7:
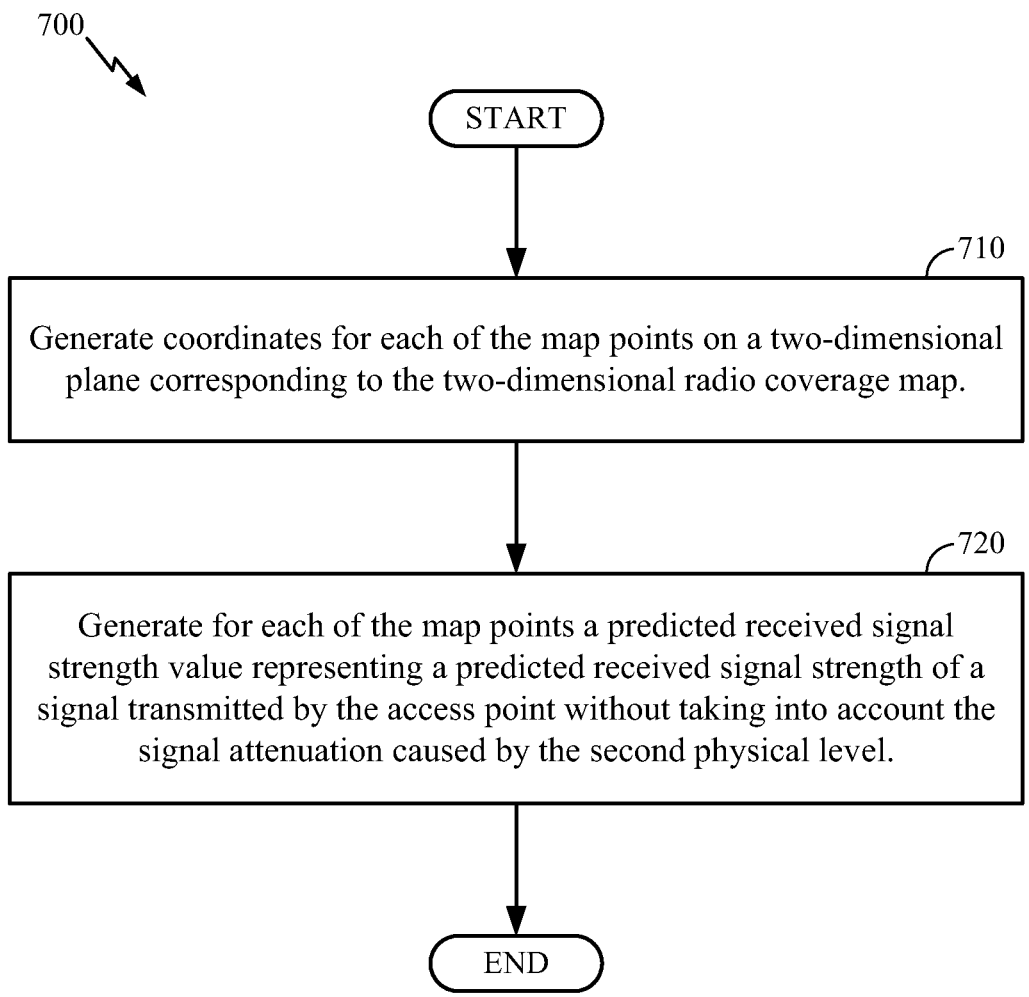
FIG. 7 is a flowchart illustrating an embodiment of process 610 shown in FIG. 6.

FIG. 7 is a flowchart illustrating an embodiment 700 of Block 610 shown in FIG. 6. The process 700 generates a two-dimensional radio coverage map 440 located between the first physical level 410 and the second physical level 420 without taking into account a signal attenuation caused by the second physical level 420.

Referring to FIG. 7 and FIG. 4, upon START, the process 700 generates coordinates for each of the map points on a two-dimensional plane corresponding to the two-dimensional radio coverage map 440 (Block 710). Then, the process 700 generates for each of the map points a predicted received signal strength value representing a predicted received signal strength of a signal transmitted by the access point 430 without taking into account the signal attenuation caused by the second physical level 420 (Block 720). The process 700 is then terminated.

Referring to Block 720 of FIG. 7, in one embodiment, the process 700 uses an equation corresponding to a simplified path loss model to generate for each of the map points a predicted received signal strength value.

In one embodiment, the process 700 uses the following equation corresponding to the simplified path loss model:

$$RSSI = RSSI_0 - 10 * pathLossExp * \log_{10}(dist2AP)$$

where:
RSSI=predicted received signal strength value in dBm
$RSSI_0$=received signal strength indicator at a distance of 1 meter from the access point in dBm=(wavelength/(4*π))^2*Ptx
where:
Wavelength=(speed of light)/(carrier frequency);
The wavelength is typically equal to 0.125 meters.
Ptx=transmission power;
Ptx ranges from −1 dBm to 20 dBm, and is nominally equal to 14 dBm. Any offset from the nominal value of transmission power is provided as a separate value in assistance information or broadcast by the access point in 802.11K protocol frames.
pathLossExp=path loss exponent;
pathLossExp is equal to 2 for free space, 1 to 5 for indoors environment, and typically is equal to 2.5.
dist2AP=distance from the map point being predicted to the position of the access point.

Referring to Block 620 of FIG. 6 and FIG. 4, in determining a projection window 424 located at a same vertical level as the second physical level 420, the process 600 determines a center of the projection window 424 and a plurality of points located on a perimeter of the projection window 424 (for example, the four corners of the projection window 424 as shown in FIG. 4). The process 600 determines the projection window 424 by using information regarding a structural layout of the wireless environment. This information may also include information regarding material types of the plurality of physical levels of the wireless environment. Examples of material types are wood, concrete, metal, etc.

In one embodiment, the projection window 424 located at a same vertical level as the second physical level 420 is an open space. In other words, the second physical level 420 has an opening. In this embodiment, the process 600 determines an open space 424 located at a same vertical level as the second physical level 420.

In another embodiment, the projection window 424 is not an open space and causes a second signal attenuation due to the material type of the projection window 424. In this embodiment, the process 600 further comprises the operation of reducing the predicted received signal strength value of each of the map points that are located within the projected area 444 by a value equal to the second signal attenuation.

Referring to Block 640 of FIG. 6 and FIG. 4, in one embodiment, the first area 446 on the two-dimensional radio coverage map 440 is adjacent to the projected area 444. In other words, in this embodiment, the two-dimensional radio coverage map 440 has two areas that are adjacent to each other, namely, the projected area 444 and the first area 446.

Referring to Block 640 of FIG. 6 and FIG. 4, in another embodiment, the first area 446 on the two-dimensional radio coverage map is not adjacent to the projected area 444. In this embodiment, the process 600 further comprises the operations of identifying a plurality of transition points in a second area 448 on the two-dimensional radio coverage map 440 that are located between the projected area 444 and the first area 446 and reducing the predicted received signal strength value of each of the transition points in the second area 448 by a value less than the signal attenuation caused by the second physical level 420. For example, the predicted received signal strength value of each of the transition points may be reduced by a value equal to half of the signal attenuation caused by the second physical level 420. The transition points in the second area 448 provide a smoother transition from the map points located within the projected area 444 to the map points located in the first area 446, in terms of predicted signal strength values. In one implementation, the second area 448 forms a 5-meter area around the boundary of the projected area 444.

Before generating the radio coverage map 440, it may be advantageous to use a process to determine approximately whether the access point 430 is radio visible from the first physical level 410. In the wireless environment shown in FIG. 4, the access point 430 is determined to be radio visible from the first physical level 410 if the signal attenuation caused by the second physical level 420 is less than or equal to a threshold.

Figure 8:
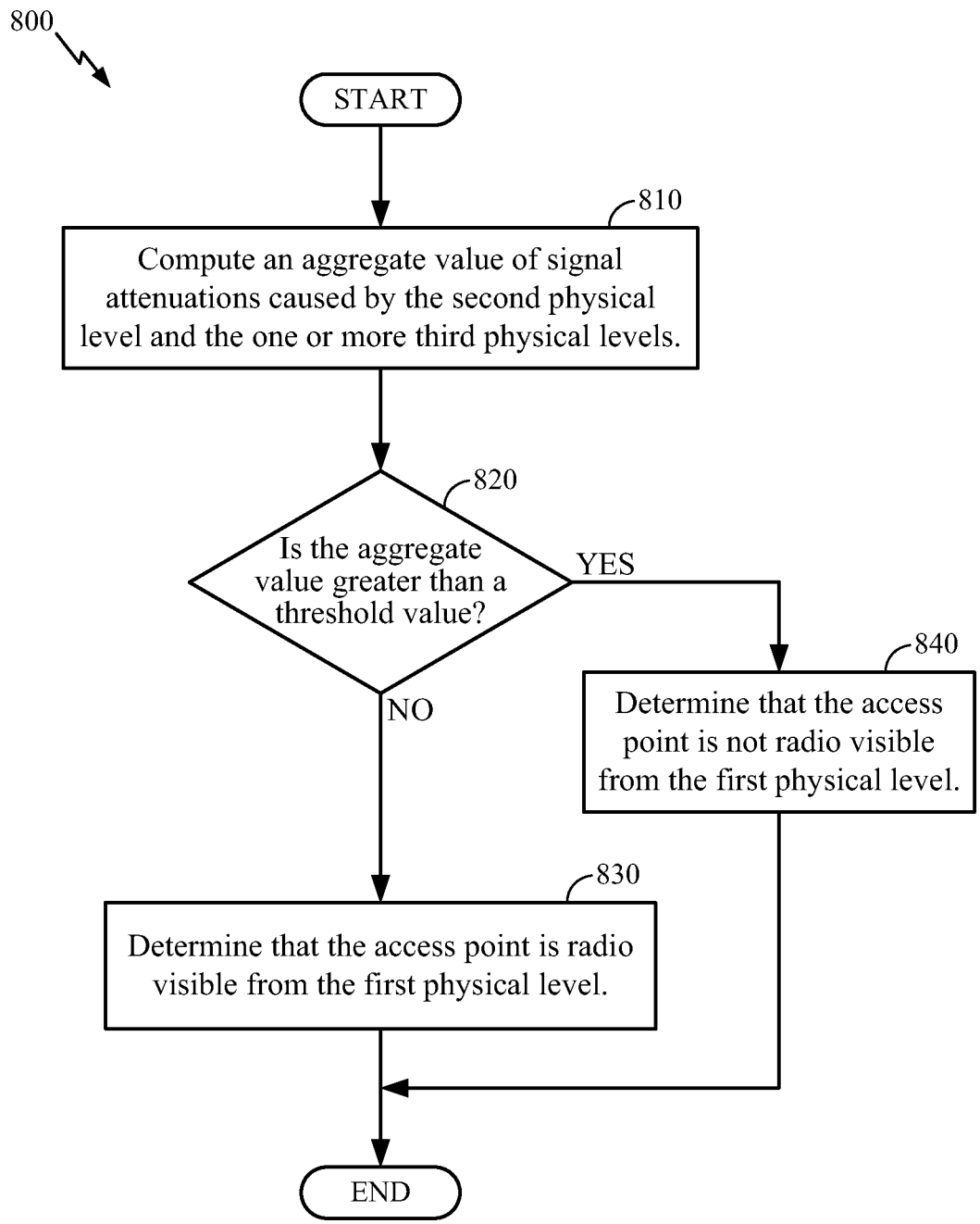
FIG. 8 is a flowchart illustrating a process of determining approximately whether the access point is radio visible from the first physical level in a multi-level wireless environment.

FIG. 8 is a flowchart illustrating a process 800 of determining approximately whether the access point is radio visible from the first physical level, in a wireless environment where there are one or more third physical levels located above the second physical level and where the access point is located above the one or more third physical levels.

Upon START, the process 800 computes an aggregate value of signal attenuations caused by the second physical level and the one or more third physical levels (Block 810). Then, the process 800 compares the aggregate value to a threshold value (Block 820). If the aggregate value of signal attenuations is less than or equal to the threshold value, the process 800 determines that the access point is radio visible from the first physical level (Block 830). If the aggregate value of signal attenuations is greater than the threshold value, the process 800 determines that the access point is not radio visible from the first physical level (Block 840). The process 800 is then terminated. The process 800 may optionally include the operation of checking existence of an open space extending from the access point 430 to the first physical level 410, using information regarding a structural layout of the wireless environment.

The process 800 is used first to determine the radio visibility of the access point from each of the physical levels of the multi-level wireless environment. Then, radio coverage maps are generated only for the physical levels from which the access point is radio visible. The process 800 is particularly beneficial for a mobile station, since the mobile station can quickly determine which access points are most likely to be radio visible from the current coarse position of the mobile station.

Figure 9:
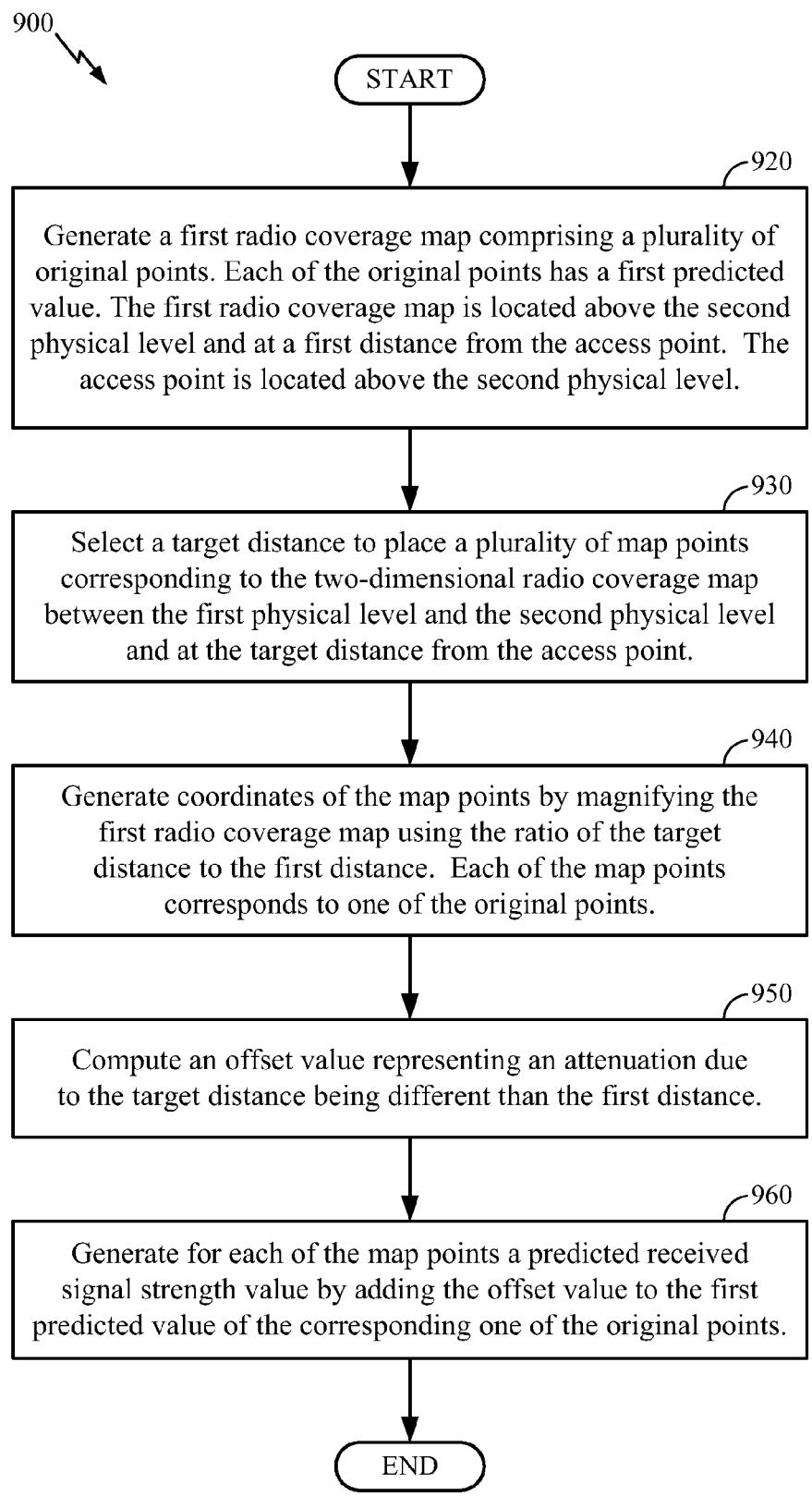
FIG. 9 is a flowchart illustrating a process of generating a two-dimensional radio coverage map for an access point in a wireless environment according to one embodiment.

FIG. 9 is a flowchart illustrating a process 900 of generating a radio coverage map for an access point in a wireless environment according to one embodiment. The wireless environment comprises a plurality of physical levels including a first physical level and a second physical level.

For clarity of description, FIG. 9 will be described with references to the example shown in FIG. 5. References made to the example shown in FIG. 5 are only to illustrate one embodiment of the invention where a target distance 442 is greater than a first distance 552. It is important to note that the process 900 is not limited to the illustrated example of FIG. 5. The process 900 is also applicable for the case where a two-dimensional radio coverage map is to be placed at a target distance that is smaller than the first distance at which a first radio coverage map is located from the access point.

Referring to FIG. 9, upon START, the process 900 generates a first radio coverage map 550 comprising a plurality of original points (Block 920). Each of the original points has a first predicted value. The first radio coverage map is located above the second physical level 420 and at a first distance 552 from the access point 430. The access point 430 is located above the second physical level 420. Next, the process 900 selects a target distance 442 to place a plurality of map points corresponding to the two-dimensional radio coverage map 440 between the first physical level 410 and the second physical level 420 and at the target distance 442 from the access point 430 (Block 930). Then, the process 900 generates coordinates of the map points by magnifying the first radio coverage map 550 using the ratio of the target distance 442 to the first distance 552 (Block 940). Each of the map points corresponds to one of the original points. Then, the process 900 computes an offset value representing an attenuation due to the target distance 442 being different than the first distance 552 (Block 950). Next, the process 900 generates for each of the map points a predicted received signal strength value by adding the offset value to the first predicted value of the corresponding one of the original points (Block 960). The process 900 is then terminated.

Referring to Block 920 of FIG. 9, the process of Block 920 may comprise the following operations. First, the process of Block 920 generates the plurality of original points corresponding to a two-dimensional plane located above the second physical level and at the first distance from the access point. Then, the process of Block 920 generates for each of the original points on the two-dimensional plane, a first predicted value representing a predicted received signal strength of a signal transmitted by the access point to produce the first radio coverage map 550 comprising the original points.

Alternately, the process of Block 920 may also generate a first radio coverage map by using an existing radio coverage map from a database as the first radio coverage map 550.

Referring to Block 940 of FIG. 9, to generate coordinates of the map points by magnifying the first radio coverage map 550 using a ratio of the target distance 442 to the first distance 552, the process 900 uses the following equations:

$$x_i = d_i/d_0 * x_0;$$

$$y_i = d_i/d_0 * y_0;$$

where:
- $(x_i, y_i)$=coordinates of one of the map points;
- $(x_0, y_0)$=coordinates of a corresponding one of the original points;
- $d_0$=the first distance;
- $d_i$=the target distance.

It is important to note that, for the case where the target distance $d_i$ is smaller than the first distance $d_0$, the ratio $d_i/d_0$ is less than 1 and the coordinates of the map points are generated by magnifying the first radio coverage map by a factor of less than 1.

Referring to FIG. 5, the first distance $d_0$ is the distance 552 from the access point 430 to the first radio coverage map 550. As a numerical example, if the first radio coverage map 550 is placed at a distance 554 of 1 meter from the second physical level 420, and the access point 430 is located at a distance 552 of 3.5 meters from the second physical level 420, then the first distance $d_0$ is equal to 2.5 meters.

Referring to FIG. 5, the target distance $d_i$ is the distance 442 from the access point 430 to the two-dimensional radio coverage map 440. As a numerical example, if the two-dimensional radio coverage map 440 is placed at a distance 412 of 1 meter from the first physical level 410, and the access point 430 is located at a distance 552 of 3.5 meters from the second physical level 420, and the distance from the first physical level 410 to the second physical level 420 is 4 meters, then the target distance $d_1$ is equal to 6.5 meters.

Referring to Block 950 of FIG. 9, the process 900 computes an offset value representing an attenuation due to the target distance 442 being different than the first distance 552 using the following equation:

$$RSSIOffset_i = 10 * pathLossExp * \log_{10}(d_0/d_i)$$

where:
- $RSSIOffset_i$=the offset value;
- pathLossExp=path loss exponent;
- $d_0$=the first distance;
- $d_i$=the target distance.

The process 900 may be used as an embodiment of the process 610 shown in FIG. 6 of generating a two-dimensional radio coverage map 440 located between the first physical level 410 and the second physical level 420 without taking into account a signal attenuation caused by the second physical level 420.

In the case where simplicity is preferred at the expense of accuracy, the projection window 424 and the projected area 444 are not determined. In such case, the process 900 can be used separately from the process 600 as an alternate way of generating a two-dimensional radio coverage map for the access point 430 as follows. First, the process 900 is performed as described previously. Then, an additional operation of reducing the predicted received signal strength value of each of the map points by a value equal to the signal attenuation caused by the second physical level 420 is performed. In the case where the wireless environment comprises one or more third physical levels located between the first physical level 410 and the second physical level 420, after the process 900 is performed, an additional operation of reducing the predicted received signal strength value of each of the map points by a value representing an aggregation of signal attenuations caused by the second physical level and the one or more third physical levels is performed.

The methods, sequences and/or algorithms described in connection with the embodiments disclosed herein can be practiced for any number of physical levels in an indoor environment. For example, if there is an access point in the space above the fourth physical level of a building, embodiments of the invention can be used to generate radio coverage maps for the first, second, third, or fourth physical levels of the building and to quickly determine whether the access point is radio visible at any of those physical levels.

Figure 10:
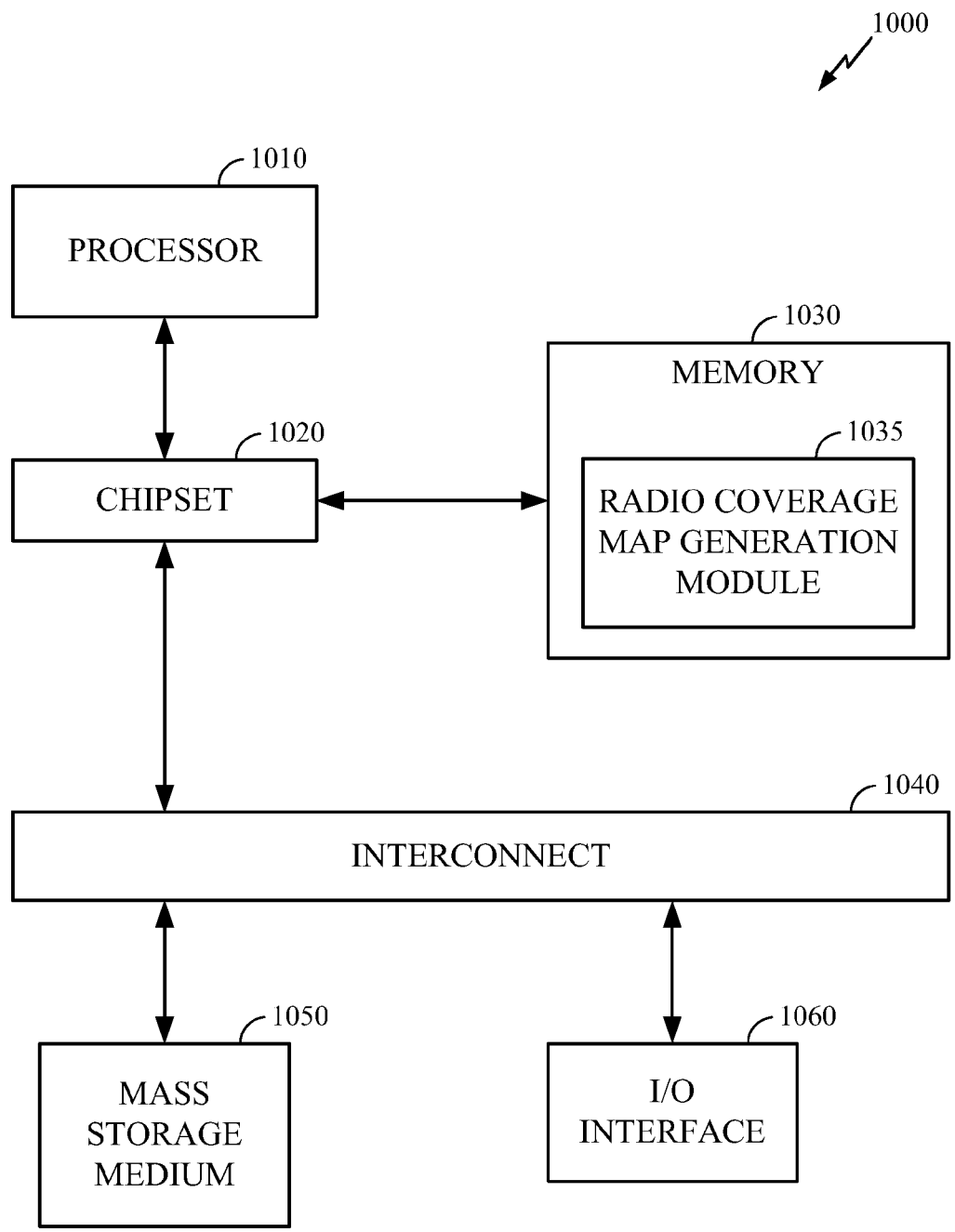
FIG. 10 is a diagram illustrating an apparatus according to one embodiment.

FIG. 10 is a diagram illustrating an apparatus 1000 according to one embodiment. The apparatus 1000 may be included in the location assistant server 140 of FIG. 1, in the location assistant server 240 of FIG. 2, or in one of the mobile stations 350 of FIG. 3. The apparatus 1000 includes a processor 1010, a chipset 1020, a memory 1030, an interconnect 1040, a mass storage medium 1050, and an input/output (I/O) interface 1060. The apparatus 1000 may include more or less components than the above components.

The processor 1010 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The chipset 1020 provides control and configuration of memory and input/output devices such as the memory 1030, the mass storage medium 1050 and the I/O interface 1060. The chipset 1020 may integrate multiple functionalities such as graphics, media, host-to-peripheral bus interface, memory control, power management, etc. It may also include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The memory 1030 stores code and data. The memory 1030 is typically implemented with dynamic random access memory (DRAM), static random access memory (SRAM), or any other types of memories including those that do not need to be refreshed. The memory 1030 may include a radio coverage map generation module 1035 that performs all or portion of the operations described above.

The interconnect 1040 provides interface to peripheral devices. The interconnect 1040 may be point-to-point or connected to multiple devices. For clarity, not all interconnects are shown. It is contemplated that the interconnect 1040 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage medium 1050 includes interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM), digital video/versatile disc (DVD), floppy drive, hard drive, tape drive, and any other magnetic or optic storage devices. The mass storage device provides a mechanism to read computer-readable media. In one embodiment, the mass storage medium 1050 may include flash memory.

The I/O interface 1060 provides interface to I/O devices such as the panel display or the input entry devices. The I/O interface 1060 may provide interface to a touch screen in the graphics display, the keypad, and other communication or imaging devices such as camera, Bluetooth interface, etc.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. The "computer-readable medium" may include any medium that may store or transfer information. Examples of the computer-readable medium include an electronic circuit, a semiconductor memory device, a read only memory (ROM), a flash memory, an erasable programmable ROM (EPROM), a floppy diskette, a compact disk (CD) ROM, an optical disk, a hard disk, etc. The computer-readable medium may be embodied in an article of manufacture. The computer-readable medium may include information or data that, when accessed by a processor, cause the processor to perform the operations or actions described above. The computer-readable medium may also include program code, instruction or instructions embedded thereon. The program code may include computer-readable code, instruction or instructions to perform the operations or actions described above. The term "information" or "data" here refers to any type of information that is encoded for computer-readable purposes. Therefore, it may include program, code, data, file, etc.

The terminology used herein is for the purpose of describing particular embodiments only and is not intended to be limiting of embodiments of the invention. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer-readable medium having stored therein a corresponding set of computer instructions that, upon execution, would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Further, all or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer-readable medium embodying a method for efficient generation of radio coverage map of an access point. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for generating a radio coverage map for an access point in a wireless environment comprising a plurality of physical levels including a first physical level and a second physical level located above the first physical level, the method comprising:
    generating, by one of a location assistance server, mobile station, or generation module, a two-dimensional radio coverage map located between the first physical level and the second physical level without taking into account a signal attenuation caused by the second physical level, the access point being located above the second physical level, the two-dimensional radio coverage map being located at a target distance from the access point and comprising a plurality of map points, each of the map points having a predicted received signal strength value;
    determining a projection window located at a same vertical level as the second physical level;
    determining a projected area on the two-dimensional radio coverage map by computing a geometrical projection from the access point through the projection window onto the two-dimensional radio coverage map;
    identifying a plurality of first points in a first area on the two-dimensional radio coverage map, the first area being outside the projected area, each of the first points having a predicted received signal strength value; and
    reducing the predicted received signal strength value of each of the first points by a value equal to the signal attenuation caused by the second physical level.

2. The method of claim 1 wherein generating the two-dimensional radio coverage map comprises:
    generating coordinates for each of the map points on a two-dimensional plane corresponding to the two-dimensional radio coverage map; and
    generating for each of the map points a predicted received signal strength value representing a predicted received signal strength of a signal transmitted by the access point without taking into account the signal attenuation caused by the second physical level.

3. The method of claim 2, wherein generating for each of the map points a predicted received signal strength value is performed using an equation corresponding to a simplified path loss model.

4. The method of claim 1, wherein determining the projection window comprises:
    determining a center of the projection window and a plurality of points located on a perimeter of the projection window.

5. The method of claim 1, wherein determining the projection window is performed using information regarding a structural layout of the wireless environment.

6. The method of claim 5, wherein the information regarding the structural layout of the wireless environment includes information regarding material types of the plurality of physical levels.

7. The method of claim 1, wherein determining the projection window comprises determining an open space located at the same vertical level as the second physical level.

8. The method of claim 1, wherein the projection window is not an open space and causes a second signal attenuation, the method further comprising:
    reducing the predicted received signal strength value of each of the map points that are located within the projected area by a value equal to the second signal attenuation.

9. The method of claim 1, wherein the first area is adjacent to the projected area.

10. The method of claim 1, wherein the first area is not adjacent to the projected area, the method further comprising:
    identifying a plurality of transition points in a second area on the two-dimensional radio coverage map that are located between the projected area and the first area, each of the transition points having a predicted received signal strength value; and
    reducing the predicted received signal strength value of each of the transition points by a value less than the signal attenuation caused by the second physical level.

11. The method of claim 1 further comprising:
    determining that the access point is radio visible from the first physical level before performing any of the steps of claim 1; wherein the access point is determined to be radio visible from the first physical level if the signal attenuation caused by the second physical level is less than or equal to a threshold.

12. The method of claim 1, wherein the wireless environment comprises one or more third physical levels located above the second physical level and the access point is located above the one or more third physical levels, the method further comprising:
    determining that the access point is radio visible from the first physical level, before performing any of the operations of the method of claim 1;
    wherein determining that the access point is radio visible comprises:
        computing an aggregate value of signal attenuations caused by the second physical level and the one or more third physical levels; and
        determining that the access point is radio visible from the first physical level if the aggregate value of signal attenuations is less than or equal to a threshold value.

13. The method of claim 1, wherein generating the two-dimensional radio coverage map comprises:
    generating a plurality of original points on a two-dimensional plane located at a first distance from the access point, between the access point and the second physical level;
    generating for each of the original points a first predicted value representing a predicted received signal strength of a signal transmitted by the access point to produce a first radio coverage map comprising the original points;
    selecting the target distance to place the two-dimensional radio coverage map at the target distance from the access point;
    generating coordinates of the map points by magnifying the first radio coverage map using a ratio of the target distance to the first distance, each of the map points corresponding to one of the original points;
    computing an offset value representing an attenuation due to the target distance being different than the first distance; and
    generating for each of the map points a predicted received signal strength value by adding the offset value to the first predicted value of the corresponding one of the original points.

14. The method of claim 13, wherein generating coordinates for each of the map points by magnifying the first radio coverage map using the ratio of the target distance to the first distance is performed in accordance with the following equations:

$$x_i = d_i/d_0 * x_0;$$

$$y_i = d_i/d_0 * y_0;$$

where:
- $(x_i, y_i)$=coordinates of one of the map points;
- $(x_0, y_0)$=coordinates of one of the original points;
- $d_0$=the first distance; and
- $d_i$=the target distance.

15. The method of claim 13, wherein computing the offset value representing the attenuation due to the target distance being different than the first distance is performed in accordance with the following equation:

$$RSSIOffset_i = 10 * pathLossExp * \log_{10}(d_0/d_i)$$

where:
- $RSSIOffset_i$=the offset value;
- pathLossExp=path loss exponent;
- $d_0$=the first distance; and
- $d_i$=the target distance.

16. An apparatus for generating a radio coverage map for an access point in a wireless environment comprising a plurality of physical levels including a first physical level and a second physical level located above the first physical level, the apparatus comprising:
- means for generating a two-dimensional radio coverage map located between the first physical level and the second physical level without taking into account a signal attenuation caused by the second physical level, the access point being located above the second physical level, the two-dimensional radio coverage map being located at a target distance from the access point and comprising a plurality of map points, each of the map points having a predicted received signal strength value;
- means for determining a projection window located at a same vertical level as the second physical level;
- means for determining a projected area on the two-dimensional radio coverage map by computing a geometrical projection from the access point through the projection window onto the two-dimensional radio coverage map;
- means for identifying a plurality of first points in a first area on the two-dimensional radio coverage map, the first area being outside the projected area, each of the first points having a predicted received signal strength value; and
- means for reducing the predicted received signal strength value of each of the first points by a value equal to the signal attenuation caused by the second physical level.

17. The apparatus of claim 16 wherein the means for generating the two-dimensional radio coverage map comprises:
- means for generating coordinates for each of the map points on a two-dimensional plane corresponding to the two-dimensional radio coverage map; and
- means for generating for each of the map points a predicted received signal strength value representing a predicted received signal strength of a signal transmitted by the access point without taking into account the signal attenuation caused by the second physical level.

18. The apparatus of claim 17, wherein the means for generating for each of the map points a predicted received signal strength value generates the predicted received signal strength value using an equation corresponding to a simplified path loss model.

19. The apparatus of claim 16, wherein the means for determining the projection window comprises:
- means for determining a center of the projection window and a plurality of points located on a perimeter of the projection window.

20. The apparatus of claim 16, wherein the means for determining the projection window utilizes information regarding a structural layout of the wireless environment.

21. The apparatus of claim 20, wherein the information regarding the structural layout of the wireless environment includes information regarding material types of the plurality of physical levels.

22. The apparatus of claim 16, wherein the means for determining the projection window comprises the means for determining an open space located at the same vertical level as the second physical level.

23. The apparatus of claim 16 wherein the projection window is not an open space and causes a second signal attenuation, the apparatus further comprising:
- means for reducing the predicted received signal strength value of each of the map points that are located within the projected area by a value equal to the second signal attenuation.

24. The apparatus of claim 16, wherein the first area is not adjacent to the projected area, the apparatus further comprising:
- means for identifying a plurality of transition points in a second area on the two-dimensional radio coverage map that are located between the projected area and the first area, each of the transition points having a predicted received signal strength value; and
- means for reducing the predicted received signal strength value of each of the transition points by a value less than the signal attenuation caused by the second physical level.

25. The apparatus of claim 16 further comprising:
- means for determining that the access point is radio visible from the first physical level; wherein the access point is determined to be radio visible from the first physical level if the signal attenuation caused by the second physical level is less than or equal to a threshold.

26. The apparatus of claim 16, wherein the means for generating the two-dimensional radio coverage map comprises:
- means for generating a plurality of original points on a two-dimensional plane located at a first distance from the access point, between the access point and the second physical level;
- means for generating for each of the original points a first predicted value representing a predicted received signal strength of a signal transmitted by the access point to produce a first radio coverage map comprising the original points;
- means for selecting the target distance to place the two-dimensional radio coverage map at the target distance from the access point;
- means for generating coordinates of the map points by magnifying the first radio coverage map using a ratio of the target distance to the first distance, each of the map points corresponding to one of the original points;
- means for computing an offset value representing an attenuation due to the target distance being different than the first distance; and
- means for generating for each of the map points a predicted received signal strength value by adding the offset value to the first predicted value of the corresponding one of the original points.

27. The apparatus of claim 26, wherein the means for generating coordinates of the map points by magnifying the first radio coverage map using the ratio of the target distance to the first distance generates coordinates of the map points in accordance with the following equations:

$$x_i = d_i/d_0 * x_0;$$

$$y_i = d_i/d_0 * y_0$$

where:
- $(x_i, y_i)$=coordinates of one of the map points;
- $(x_0, y_0)$=coordinates of one of the original points;
- $d_0$=the first distance; and
- $d_i$=the target distance.

28. The apparatus of claim 26, wherein the means for computing the offset value computes the offset value in accordance with the following equation:

$$RSSIOffset_i = 10 * pathLossExp * \log_{10}(d_0/d_i)$$

where:
- $RSSIOffset_i$=the offset value;
- pathLossExp=path loss exponent;
- $d_0$=the first distance; and
- $d_i$=the target distance.

29. An article of manufacture comprising a non-transitory computer-readable storage medium comprising program code for generating a radio coverage map for an access point in a wireless environment comprising a plurality of physical levels including a first physical level and a second physical level located above the first physical level, the program code comprising instructions that, when executed by a processor, cause the processor to perform operations comprising:
- generating a two-dimensional radio coverage map located between the first physical level and the second physical level without taking into account a signal attenuation caused by the second physical level, the access point being located above the second physical level, the two-dimensional radio coverage map being located at a target distance from the access point and comprising a plurality of map points, each of the map points having a predicted received signal strength value;
- determining a projection window located at a same vertical level as the second physical level;
- determining a projected area on the two-dimensional radio coverage map by computing a geometrical projection from the access point through the projection window onto the two-dimensional radio coverage map;
- identifying a plurality of first points in a first area on the two-dimensional radio coverage map, the first area being outside the projected area, each of the first points having a predicted received signal strength value; and
- reducing the predicted received signal strength value of each of the first points by a value equal to the signal attenuation caused by the second physical level.

30. The article of manufacture of claim 29, wherein the instructions causing the processor to perform the operation of generating a two-dimensional radio coverage comprises instructions that, when executed by the processor, cause the processor to perform operations comprising:
- generating coordinates for each of the map points on a two-dimensional plane corresponding to the two-dimensional radio coverage map; and
- generating for each of the map points a predicted received signal strength value representing a predicted received signal strength of a signal transmitted by the access point without taking into account the signal attenuation caused by the second physical level.

31. The article of manufacture of claim 30, wherein the instructions causing the processor to perform the operation of generating for each of the map points a predicted received signal strength value cause the processor to perform the operation using an equation corresponding to a simplified path loss model.

32. The article of manufacture of claim 29, wherein the instructions causing the processor to perform the operation of determining the projection window comprises instructions that, when executed by the processor, cause the processor to perform operations comprising:
- determining a center of the projection window and a plurality of points located on a perimeter of the projection window.

33. The article of manufacture of claim 29, wherein the instructions causing the processor to perform the operation of determining the projection window cause the processor to perform the operation using information regarding a structural layout of the wireless environment.

34. The article of manufacture of claim 33, wherein the information regarding the structural layout of the wireless environment includes information regarding material types of the plurality of physical levels.

35. The article of manufacture of claim 29, wherein the instructions causing the processor to perform the operation of determining the projection window cause the processor to perform the operation of determining an open space located at the same vertical level as the second physical level.

36. The article of manufacture of claim 29, wherein the projection window is not an open space and causes a second signal attenuation, and wherein the program code further comprising instructions that, when executed by the processor, cause the processor to perform operations comprising:
- reducing the predicted received signal strength value of each of the map points that are located within the projected area by a value equal to the second signal attenuation.

37. The article of manufacture of claim 29, wherein the first area is not adjacent to the projected area, and wherein the program code further comprising instructions that, when executed by the processor, cause the processor to perform operations comprising:
- identifying a plurality of transition points in a second area on the two-dimensional radio coverage map that are located between the projected area and the first area, each of the transition points having a predicted received signal strength value; and
- reducing the predicted received signal strength value of each of the transition points by a value less than the signal attenuation caused by the second physical level.

38. The article of manufacture of claim 29, wherein the program code further comprising instructions that, when executed by the processor, cause the processor to perform operations comprising:
- determining that the access point is radio visible from the first physical level before performing any of the operations of claim 29;
- wherein the access point is determined to be radio visible from the first physical level if the signal attenuation caused by the second physical level is less than or equal to a threshold.

39. The article of manufacture of claim 29, wherein the instructions causing the processor to perform the operation of generating a two-dimensional radio coverage comprises instructions that, when executed by the processor, cause the processor to perform operations comprising:

generating a plurality of original points on a two-dimensional plane located at a first distance from the access point, between the access point and the second physical level;

generating for each of the original points a first predicted value representing a predicted received signal strength of a signal transmitted by the access point to produce a first radio coverage map comprising the original points;

selecting the target distance to place the two-dimensional radio coverage map at the target distance from the access point;

generating coordinates of the map points by magnifying the first radio coverage map using a ratio of the target distance to the first distance, each of the map points corresponding to one of the original points;

computing an offset value representing an attenuation due to the target distance being different than the first distance; and generating for each of the map points a predicted received signal strength value by adding the offset value to the first predicted value of the corresponding one of the original points.

40. The article of manufacture of claim 39, wherein the instructions causing the processor to perform the operation of generating coordinates of the map points cause the processor to perform the operation in accordance with the following equations:

$$x_i = d_i/d_0 * x_0;$$

$$y_i = d_i/d_0 * y_0$$

where:
- $(x_i, y_i)$=coordinates of one of the map points;
- $(x_0, y_0)$=coordinates of one of the original points;
- $d_0$=the first distance; and
- $d_i$=the target distance.

41. The article of manufacture of claim 39, wherein the instructions causing the processor to perform the operation of computing the offset value cause the processor to perform the operation in accordance with the following equation:

$$RSSIOffset_i = 10 * pathLossExp * \log_{10}(d_0/d_i)$$

where:
- $RSSIOffset_i$=the offset value;
- pathLossExp=path loss exponent;
- $d_0$=the first distance; and
- $d_i$=the target distance.

42. An apparatus for generating a radio coverage map for an access point in a wireless environment comprising a plurality of physical levels including a first physical level and a second physical level located above the first physical level, the apparatus comprising:

logic configured to generate a two-dimensional radio coverage map located between the first physical level and the second physical level without taking into account a signal attenuation caused by the second physical level, the access point being located above the second physical level, the two-dimensional radio coverage map being located at a target distance from the access point and comprising a plurality of map points, each of the map points having a predicted received signal strength value;

logic configured to determine a projection window located at a same vertical level as the second physical level;

logic configured to determine a projected area on the two-dimensional radio coverage map by computing a geometrical projection from the access point through the projection window onto the two-dimensional radio coverage map;

logic configured to identify a plurality of first points in a first area on the two-dimensional radio coverage map, the first area being outside the projected area, each of the first points having a predicted received signal strength value; and logic configured to predict received signal strength value of each of the first points by a value equal to the signal attenuation caused by the second physical level.

43. The apparatus of claim 42, further comprising:

logic configured to generate coordinates for each of the map points on a two-dimensional plane corresponding to the two-dimensional radio coverage map; and logic configured to generate for each of the map points a predicted received signal strength value representing a predicted received signal strength of a signal transmitted by the access point without taking into account the signal attenuation caused by the second physical level.

44. The apparatus of claim 43, wherein the logic configured to perform the operation of generating for each of the map points a predicted received signal strength value is configured to perform the operation using an equation corresponding to a simplified path loss model.

45. The apparatus of claim 42, further comprising logic configured to determine a center of the projection window and a plurality of points located on a perimeter of the projection window.

46. The apparatus of claim 42, wherein the logic configured to perform the operation of determining the projection window is configured to perform the operation using information regarding a structural layout of the wireless environment.

47. The apparatus of claim 46, wherein the information regarding the structural layout of the wireless environment includes information regarding material types of the plurality of physical levels.

48. The apparatus of claim 42, wherein the logic configured to perform the operation of determining the projection window is configured to perform the operation of determining an open space located at the same vertical level as the second physical level.

* * * * *